United States Patent Office 3,006,896
Patented Oct. 31, 1961

3,006,896
HARDENABLE CONDENSATION PRODUCTS AND
A PROCESS FOR PREPARING THEM
Karl Horst, Hofheim (Taunus), and Heino Wellens and
Ludwig Orthner, Frankfurt am Main, Germany, assignors to Farbwerke Hoechst Aktiengesellschaft vormals Meister Lucius & Brüning, Frankfurt am Main,
Germany, a corporation of Germany
No Drawing. Filed Jan. 21, 1958, Ser. No. 710,195
22 Claims. (Cl. 260—70)

It has been found that compounds which are extraordinarily suited for finishing fibrous materials, such as textiles, paper and leather, can be obtained by reacting according to known processes polyamines containing at least 3 reactive amino groups with at least 2 mols of substances suitable for the introduction of urea-groups, and by partially reacting the reaction products so obtained with long-chain, aliphatic compounds containing a functional group suited for the reaction with amino or carbonamide groups and which may be interrupted or substituted by aromatic, cycloaliphatic, heterocyclic groups or hetero atoms, and by converting in known manner the ureas so obtained which are substituted by one or more long-chain radicals, with aldehydes into methylol compounds or substituted methylol compounds; if desired, the methylol groups may subsequently be etherified according to known processes.

The compounds obtained according to the process of the present invention are new and well suited for softening and making the fibrous materials mentioned water-repellent and fast to scraping and for imparting to them strength in the wet state.

Polyamines coming into consideration for the preparation of the ureas mentioned in the claims are, for example, diethylene triamine, triethylene tetramine, dipropylene triamine, tripropylene tetramine and higher members of these series, polyaminobenzenes, polyamino naphthalenes etc. as well as the polyamines obtainable by condensing compounds which contain active hydrogen atoms, such as alcohols or amines, with acrylonitrile, and by subsequent hydrogenation, for example the product obtained by reaction of ethylene diamine with 2 mols of acrylonitrile and subsequent hydrogenation.

The introduction of the two urea groups into the polyamines mentioned may be carried out according to known processes, for example by condensation with urea, reaction with nitro-urea, or with potassium cyanate. The conversion of the polyamines into ureas may advantageously be carried out by condensation with urea at temperatures of 90–160° C., advantageously at 110–140° C. A good yield of ureas, which may in part contain free amino groups, can be obtained by suitably carrying out the reaction and with the use of corresponding portions of urea.

By checking the amounts of ammonia split off it is possible to break the reaction off when basic groups are still present.

When diethylene triamine is for example condensed with urea there may simultaneously take place the following reactions:

(1) $HN(CH_2CH_2NH_2)_2 + 2NH_2CONH_2 \longrightarrow$

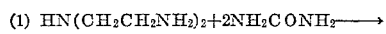
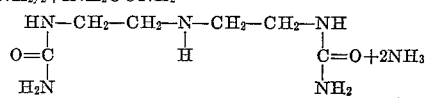

(2) $HN(CH_2CH_2NH_2)_2 + 2NH_2CONH_2 \longrightarrow$

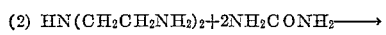
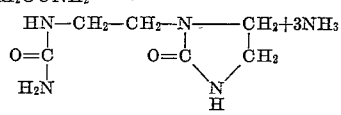

(3) $HN(CH_2CH_2NH_2)_2 + 3NH_2CONH_2 \longrightarrow$

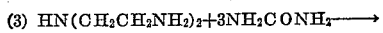
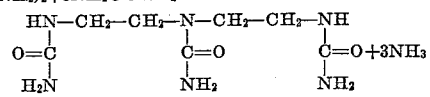

(4) $HN(CH_2CH_2NH_2)_2 + 1NH_2CONH_2 \longrightarrow$

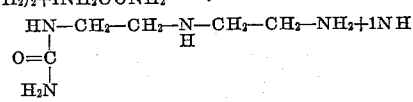

(5) $HN(CH_2CH_2NH_2)_2 + 1NH_2CONH_2 \longrightarrow$

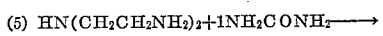
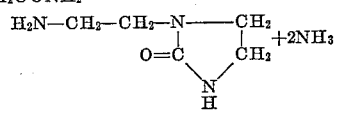

By regulating the proportion of diethylene triamine and urea and by varying the temperature and the reaction period, the reaction can be directed in such a manner that one or the other of the compounds formulated according to equations 1–5, is preferably formed. When using, for example, 2 mols of urea per 1 mol of diethylene triamine and heating to 130° C., there are preponderantly obtained the compounds formulated according to Equations 1 and 2. When the reaction is broken off after 2 mols of ammonia have been split off, there is mainly obtained bis-(ureido-ethyl)-amine (Equation 1); when the reaction is, however, carried out until 3 mols of ammonia have been split off, the 2-N-β-ureido-ethyl-imidazolidone (Equation 2) is preferably obtained.

As long-chain aliphatic compounds there come into consideration compounds containing at least 10, advantageously 16–18 carbon atoms. These compounds may be straight-chain, branch-chain and also interrupted or substituted by aromatic, cycloaliphatic, heterocyclic radicals or hetero atoms and they must have a functional group suited for the reaction with the amino or carbonamide groups of the ureas.

Such reactive groups are, for example, the ester groups of carboxylic acid, carboxylic anhydride, carboxylic halide, carboxylic azide, carbamide chloride, isocyanate and chlorocarbonic acid, furthermore methylol compounds, such as stearic acid-N-methylol-amide, octadecyl-N-methylolurethane, and chloromethyl ether of high molecular alcohols, such as octadecyl-chloromethyl ether. The reaction with isocyanates or carboxylic halides or azides can be carried out in an aqueous medium, the reaction with fatty halides, carbamine chlorides, chlorocarbonic esters or chloromethyl ethers may also be carried out in pyridine or other organic solvents. If desired, the use of solvents may be dispensed with. As long-chain radical according to the present invention and containing at least twelve carbon atoms, there may be named, by way of example, the radicals of lauric acid, palmitic acid, stearic acid and arachic acid. The alkyl radicals being the basis of these acids, are equally suited. Instead of employing the compounds mentioned per se there may also be used mixtures thereof. The choice of the reaction conditions depends in each case on the properties of the reactants. The reaction with stearic acid can, for example, be carried out in the absence of solvents at temperatures of 160–190° C. and the reaction with octadecyl isocyanate in an aqueous medium at temperatures between 25 and 90° C. The products prepared according to said process are obtained as a light, pasty mass, easily emulsifiable in water which is subsequently converted in known manner into a methylol compound.

For the preparation of the methylol compounds there can be used formaldehyde per se or in the commercial aqueous solution of 30–40% strength or as paraformaldehyde in the form of an aqueous or alcoholic suspension or in the combined form, for example, as dimethylol formamide. 0.5–2 mols, preferably 0.8–1.5 mols of formaldehyde are used per urea group introduced into the polyamine. Substituted methylolamides are obtained when correspondingly using other aldehydes; acetaldehyde and glyoxal yield for example the groups

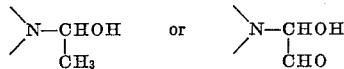

The reaction with aldehydes can be carried out at temperatures of 20–100° C., preferably 25–70° C., and at pH valves of 4–11, preferably 5–9. The reaction period can generally be reduced to three hours or less. There are principally obtained monomeric methylol compounds; when suitably carrying out the reaction, one part of the products can, however, be obtained as so-called precondensates. For many purposes it is advantageous to etherify the methylol groups according to known processes, for example by heating for a short time, in a strongly acid medium with an excess quantity of alcohol. As alcohols there come principally into consideration the low-molecular aliphatic alcohols, such as methyl, ethyl, propyl, isopropyl, butyl and isobutyl alcohol.

The products obtained according to the process of the present invention are aqueous pastes or emulsions; they are stable and storable for a long time under neutral or weakly alkaline conditions, also at temperatures up to 60° C. They are valuable auxiliaries, for example in the textile, leather and paper industry, being especially suited for softening and hydrophobizing cotton, cellulose and wool fabrics as well as fabrics of synthetic fibres and for making them fast to scraping and shrinking. They are likewise suitable for hydrophobizing leather and for imparting to paper strength in the wet state. They can be used as follows: the materials to be finished are impregnated with an aqueous liquor containing in addition to the condensation products described, one of the known catalysts active in the acid pH region; they are dried and then fixed by means of a condensation process carried out at temperatures of 80–170° C., preferably at 100–150° C. Suitable catalysts are, for example, carboxylic acids, such as lactic acid, glycolic acid etc. or acid-separating compounds, such as ammonium nitrate, aluminum sulfate etc.

For the water-repelling impregnation of textiles there can be used 20–60 grams of the condensation products per liter of treatment bath. Considerably smaller quantities, for example 3–20 grams of the condensation products per liter, suffice in order to impart to the material a soft handle. The textiles so treated are especially distinguished by an excellent water-repellent effect, especially fabrics of staple fibers show a pleasant, soft handle.

In order to make leather water-repellent, 3–10% of the leather weight can be incorporated by impregnation. In order to impart wet strength to paper, 2 to 5% can be incorporated by impregnation.

The products can advantageously be used per se or together with textile finishing products of the aminoplast type used for making the materials resistant to creasing, shrinking and swelling. There may be named by way of example the condensation products of formaldehyde with melamine, urea, dicarboxylic diamides and bis-urethanes or the still water-soluble precondensation phases or the ethers thereof with mono- or polyhydric alcohols. Furthermore the products can advantageously be combined with filling plastic latices (for example polyvinyl acetate, polyvinyl propionate, polyacrylic esters) and finishing agents, such as polyvinyl alcohol, polyacrylic amide, starch, glue and water-soluble cellulose derivatives. It is also possible to combine them with paraffins and waxes, which is especially advantageous for hydrophobizing, without impairing the homogeneity of the bases or emulsions.

The following examples serve to illustrate the invention but they are not intended to limit it thereto:

Example 1

(a) 103 grams of diethylene triamine and 120 grams of urea are heated to 130° C. in a reaction vessel provided with a stirrer, a thermometer, a gas inlet and outlet. The mixture becomes homogeneous at 95–100° C. and the reaction sets in while ammonia is vigorously split off. The ammonia is introduced with nitrogen into 5N-sulfuric acid. When—measured by the amount of sulfuric acid used up—about 40 grams of ammonia have been split off, the reaction is terminated and the melt is poured out. The reaction product solidifies to form a friable, yellow-brown, somewhat hygroscopic mass.

(b) 180 grams of the product obtained according to (a) are dissolved in 750 ml of water. 302 grams of stearoyl chloride and a caustic soda solution of 20% strength are added dropwise within 2 hours at 15–25° C. in an amount such that a pH value of about 8 of the reaction mixture is maintained. After the addition has been terminated, the mixture is stirred for another half an hour at 40° C., while the pH value can fall to 6–7. The mixture is allowed to settle, the brine is removed and the mixture is washed twice, in each case with 300 ml. of water. After 1–2% of an emulsifier has been added, it is possible to emulsify the acylated product at 40–50° C. in water. After 220 grams of formalin of 30% strength have been added, the mixture is adjusted to a pH of 8.5 and stirred for 3 hours at 60° C. The methylol compound is obtained as a homogeneous, almost white paste of ~45% strength.

(c) A fabric of cotton poplin is impregnated with an aqueous emulsion of 4 grams per liter of the paste obtained according to (1b) and one of the hardening catalysts generally used (for example 3 grams per liter of ammonium nitrate), squeezed to 100% of moisture absorption and dried at temperatures below 70° C. The fabric so treated is subsequently heated for 5 minutes at 140° C. or for 3 minutes at 160° C. This treatment imparts to the fabric a soft and full handle and fastness to washing.

(d) 100 grams of the paste obtained according to (1b) are stirred at 60° C. with 20 grams of a solution of 50% strength of paraffin in chlorobenzene so that a homogeneous paste is obtained. This paste is dilute with water of 50° C., wherein 5 grams of aluminum sulfate are dissolved per 1 liter. Cotton poplin is impregnated with the liquor so obtained as described in Example 1c. A finish is obtained having good water-repellent properties.

Example 2

180 grams of the resin obtained according to Example 1a are dissolved with 10 grams of an emulsifier in 1 liter of water. 270 grams of octadecyl isocyanate are added within 1 hour at 40° C. The emulsion which becomes more and more stiff, is stirred for another hour at 60–70° C. and then mixed with 220 grams of formalin of 30% strength. The mixture is stirred for 2 hours at 60° C., and then adjusted to a pH of 7 by means of acetic acid. The reaction product is obtained in the form of a homogeneous, white paste of about 30% strength which can be diluted with water without breaking off the emulsion.

20 grams of an ammonium nitrate solution of 24% strength and 500 grams of an aqueous solution of 24% strength of hexamethylol melamine are added to 100 grams of the paste so obtained and the whole is subsequently diluted with water to 1 liter. A fabric of staple fibers is impregnated with the emulsion so obtained, squeezed to 100% of moisture content and dried at temperatures below 70° C. The fabric is subsequently exposed for 5–10 minutes to a heat of 140° C. The fabric so impregnated has a water-repellent finish of fastness to washing.

Example 3

149 grams of triethylene tetramine and 170 grams of urea are condensed as described in Example 1a until about 55 grams of ammonia have been split off. The mixture is allowed to cool to 100° C., 900 ml. of water are added and the whole is stirred until a clear solution is obtained. This solution is mixed with 10 grams of an emulsifier and there are then added at 40° C., while stirring and within 1 hour, 300 grams of octadecyl isocyanate. The emulsion which becomes stiffer is stirred for another hour at 60–70° C. and mixed with 330 grams of formalin of 30% strength. After stirring for 2 hours at 60° C. and adjusting to a pH of 6.5–7, the reaction product obtained as a homogeneous, yellow-white paste of about 35% strength can be filled up.

Example 4

275 grams of the condensation product of triethylene tetramine and urea are dissolved in 500 ml. of water. This solution is mixed with a solution of 314 grams of stearic acid-N-methylolamide in 500 ml. of methanol and heated for 3 hours with reflux. The reaction product is mixed with 330 grams of an aqueous formalin solution of about 30% strength and stirred for 3 hours at 60° C. and a pH of 8–9. There is obtained an aqueous-methanolic emulsion of 35–40% strength which can be diluted with water as desired.

Example 5

131 grams of dipropylene triamine and 120 grams of urea are condensed at 25–130° C. in a reaction vessel provided with a stirrer, a thermometer and a gas inlet and outlet until about 40 grams of ammonia have been separated. The melt so obtained is dissolved in 500 cm.$^3$ of water and reacted at 40–50° C. with 270 grams of octadecyl isocyanate. After about 2 hours the white paste obtained in the course of the reaction is mixed with 240 grams of aqueous formalin of 30% strength and the mixture is stirred for 2 hours at 60° C. and a pH value of 8.5–9. Subsequently 6 liters of methanol are added and the solution being clear at 60–70° C. is mixed with hydrochloric acid of 20% strength in such an amount that a pH of 1.5–2 is obtained. The solution is stirred for another 20 minutes at 60° C., adjusted to a pH of 7.5 by means of caustic soda solution of 20% strength and reduced to a total weight of 1200 grams by evaporating the methanol. The reaction product obtained again in the form of a white paste is stirred with a mixture of 140 grams of paraffin (solidification point 50–60° C.) and 80 grams of xylol until it becomes homogeneous. It is possible to dilute the paste of 50% strength with water in any proportion. Instead of the 6 liters of methanol indicated there may be used the same quantity of ethanol, propanol or butanol.

Example 6

174 grams of dipropylene monoethylene tetramine (prepared from ethylene diamine and acrylonitrile and by subsequent hydrogenation of the dinitrile) and 150 grams of urea are condensed as described in Example 6 until about 45 grams of ammonia have been split off. The reaction product (about 280 grams) is dissolved in 1.5 liters of water and reacted at 0° C. within about 3 hours with 320 grams of a mixture of 60 parts of stearoyl chloride and 40 parts of palmitoyl chloride. The pH value of the mixture has to be about 9. After all of the acid chloride has been added, the mixture is stirred for another hour at 40° C. and a pH of 9. The mixture is allowed to settle, the aqueous solution is removed and the residue is washed twice, in each case with 500 grams of water. The reaction product is stirred in 1200 grams of water while adding 1% of an emulsifier (for example of an alkyl-aryl polyglycol ether), mixed at a pH of 9 with 300 grams of formalin of 30% strength and the mixture is then stirred for another 2 hours at 60° C. The mixture is then adjusted to a pH value of 2–2.5 by means of formic acid and stirred for another 20 minutes at 60° C. The reaction mixture is subsequently adjusted to a pH value of 7–7.5 by means of a caustic soda solution of 20% strength. The suspension of about 25–26% strength obtained as precondensate, can be used for softening and hydrophobizing natural and artificial fibers as well as for making paper water-repellent.

We claim:

1. A process for preparing nitrogen-containing hardenable condensation products which comprises (a) heating a mixture of one molar part of a polyamine of the general formula $NH_2(C_nH_{2n}NH)_xH$ wherein $n$ and $x$ are integers from about 2 to 3 with about 2 molar parts of urea, when $x$ is 2, and with about 2 to 3 molar parts of urea, when $x$ is 3, to a temperature of about 90 to 160° C., the amount of urea being sufficient to react with all of the primary amino groups of the polyamine with evolution of ammonia but insufficient to react with all of the secondary amino groups thereof; (b) reacting the urea-modified polyamine thus obtained with about 0.2 to about one mol, per mol of polyamine, of a long chain aliphatic compound having the general formula RX wherein R is an alkyl group containing about ten to eighteen carbon atoms and X is a member of the group consisting of reactive —COOH, —COCL, —NCO, —CONHCH$_2$OH and —OCH$_2$Cl groups; and (c) further reacting the products thus obtained by heating to a temperature of 40 to 100° C. in an aqueous solution at a pH of 7 to 10 with about 0.5 to 2 mols of formaldehyde per urea group reacted with said polyamine in step (a), whereby methylol groups are formed.

2. The process as defined in claim 1 wherein in addition the methylol groups of the product are etherified by heating, to a temperature of 30 to 70° C. and at a pH of about 1 to 3, with a lower alkyl monohydric alcohol.

3. The process as defined in claim 1 wherein the polyamine in stage (a) is diethylene triamine.

4. The process as defined in claim 1 wherein the polyamine in stage (a) is triethylene tetramine.

5. The process as defined in claim 1 wherein the polyamine in stage (a) is dipropylene triamine.

6. The process as defined in claim 1 wherein the polyamine in stage (a) is tripropylene tetramine.

7. The process as defined in claim 1 wherein the polyamine in stage (a) is dipropylene monoethylene tetramine.

8. The process as defined in claim 2 wherein the polyamine in stage (a) is diethylene triamine.

9. The process as defined in claim 2 wherein the polyamine in stage (a) is triethylene tetramine.

10. The process as defined in claim 2 wherein the polyamine in stage (a) is dipropylene triamine.

11. The process as defined in claim 2 wherein the polyamine in stage (a) is dipropylene monoethylene tetramine.

12. The process as defined in claim 2 wherein the polyamine in stage (a) is tripropylene tetramine.

13. The process as defined in claim 1 wherein the long chain aliphatic compound in stage (b) is stearoyl chloride.

14. The process as defined in claim 1 wherein the long chain aliphatic compound in stage (b) is octadecyl isocyanate.

15. The process as defined in claim 1 wherein the long chain aliphatic compound in stage (b) is stearic acid-N-methylol amide.

16. The process as defined in claim 2 wherein the long chain aliphatic compound in stage (b) is stearoyl chloride.

17. The process as defined in claim 2 wherein the long chain aliphatic compound in stage (b) is octadecyl isocyanate.

18. The process as defined in claim 2 wherein the long chain aliphatic compound in stage (b) is stearic acid-N-methylol amide.

19. The product obtained by the process defined in claim 1.

20. The product obtained by the process defined in claim 2.

21. A fibrous material impregnated with fixed condensation products prepared as defined in claim 1.

22. A fibrous material impregnated with fixed condensation products prepared as defined in claim 2.

References Cited in the file of this patent

UNITED STATES PATENTS

| | | |
|---|---|---|
| 2,696,504 | Yost et al. | Dec. 7, 1954 |
| 2,699,435 | Auten et al. | Jan. 11, 1955 |
| 2,742,450 | Yost et al. | Apr. 17, 1956 |
| 2,783,231 | Albrecht et al. | Feb. 27, 1957 |

FOREIGN PATENTS

| | | |
|---|---|---|
| 620,142 | Great Britain | Mar. 21, 1949 |
| 744,110 | Great Britain | Feb. 1, 1956 |